Patented Oct. 10, 1922.

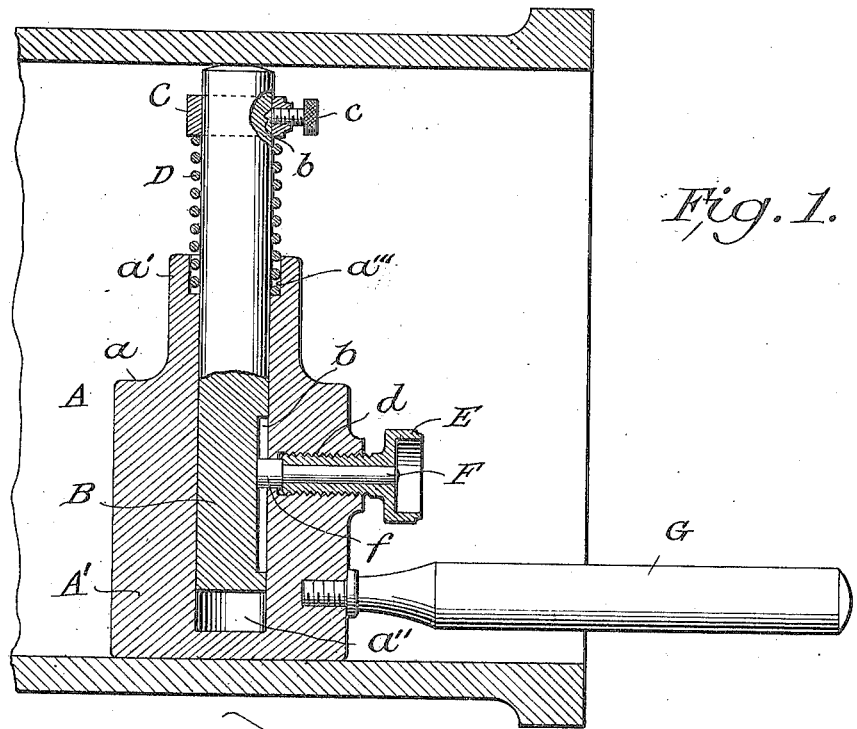
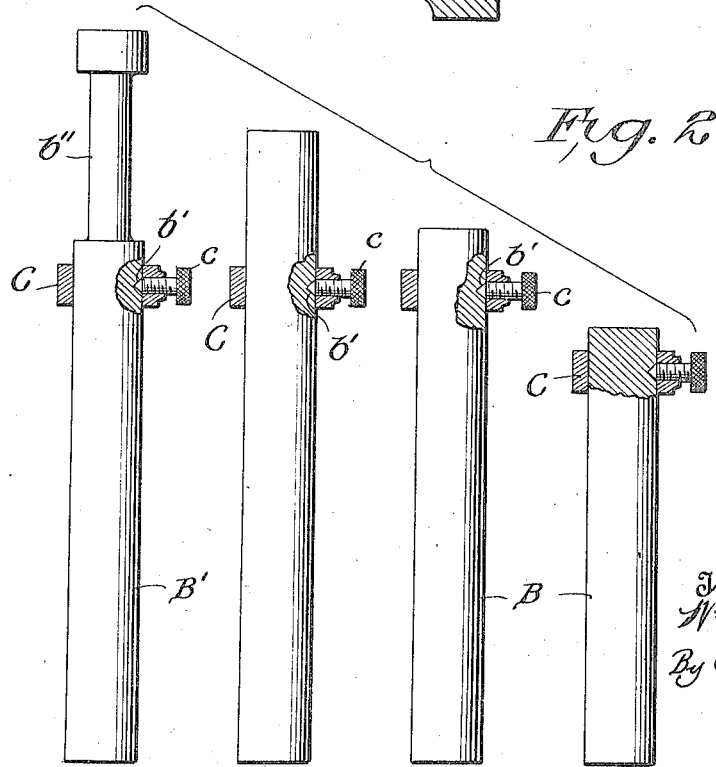

1,431,612

UNITED STATES PATENT OFFICE.

WILLIAM WITTNER, OF JERSEY CITY, NEW JERSEY.

TELESCOPING PLANER AND SHAPER GAUGE.

Application filed December 22, 1921. Serial No. 524,248.

*To all whom it may concern:*

Be it known that I, WILLIAM WITTNER, a citizen of the United States, residing at Jersey City, in the county of Hudson and State of New Jersey, have invented certain new and useful Improvements in Telescoping Planer and Shaper Gauges, of which the following is a specification.

This invention relates to a telescoping gauge adapted for use with a planer, a shaper, a milling machine and a lathe.

The object of my invention is to provide a telescoping gauge of simple construction adapted for quickly taking any measurement by a micrometer caliper or a vernier, and any height, depth or width, for use in making grooves, steps, slots, etc., also for setting a sine bar any required degree or minute, without the use of a high gauge.

This instrument measures close to a tenth of one thousandth of an inch and can be quickly manipulated.

The matter constituting my invention will be defined in the claims.

The details of construction are shown in the accompanying drawing, in which:

Figure 1 represents a vertical section of the gauge.

Figure 2 represents elevations of a series of interchangeable plungers of different heights for taking different measurements.

The gauge A is made with an outer socket case $A^1$ having at the base a comparatively thick wall, and above the middle height a reduced extension $a'$ and an annular shoulder $a$, also having a central longitudinal socket or passageway $a''$, provided at the upper end with an enlargement and an annular seat $a'''$ for a spiral compress spring D. The plunger B is made of a diameter to make an easy sliding fit in the socket $a''$ and of a length to extend about one-third of its length above the top end of case $A^1$. It is provided with a longitudinal guide groove $b$ in its lower end and with an I spot or indentation $b'$ near its upper end. A collar C having a thumb screw $c$ is fitted to the upper end of the plunger and held in place by the screw engaging at its point in the indentation $b'$. This collar serves as a bearing for spring D, which is spiral and tends to push the plunger B upward or outward and cause its end to bear upon the inner surface of the opening or passageway to be measured. In the body $A^1$ is made a transverse opening $d$ for receiving the screw threaded shank of a lock nut E. The lock nut and its shank are hollow for receiving the brake pin F which has an inner head $f$ adapted to fit in the groove $b$ to form a guide, and also to be forced by the nut E into contact with the plunger to hold it rigidly in position after a measurement has been taken. The hole $d$ is of reduced size at its inner end and is not threaded so that the head $f$ shall fit snugly in place and may serve as a bearing for the end of the shank of lock nut E when it is desired to lock the plunger B in place. A long handle G is preferably secured to the body $A^1$ below the lock nut E for inserting the instrument in a long hole or keyway.

In Fig. 2 are illustrated plungers of different lengths for adapting the instrument for taking measurements of shorter or longer holes, and they may be made from one inch to six or more inches in length and provided with indentations $b'$ and collars C with set-screws $c$. The longer plungers, as indicated at $B^1$, may have a reduced portion $b''$ to make them lighter.

This gauge can be very quickly used, as the manipulation is very simple. When it is to be inserted in a hole, the lock nut E is slackened to release the plunger, then the instrument is inserted into the hole and the lock nut turned to tighten the head $f$ of the brake pin in the groove $b$ and thus rigidly hold the plunger in place. On removing the gauge from the hole measurement can be taken by a micrometer caliper or a vernier. Measurements close to a ten thousandths of an inch may be taken.

Variations in the details of construction may be made without departing from the spirit and scope of my invention.

Having described my invention, what I claim and desire to secure by Letters Patent is:

1. A telescoping gauge comprising a socket case having a longitudinal socket provided near the top with a seat for a spring, a plunger adapted to slide freely in the socket and having at its upper end a stop device, a spiral spring on the plunger between said seat and the stop device, a lock nut having a threaded stem and a longitudinal opening and a brake pin therein, said stem and pin being adapted to bear upon the plunger.

2. A telescoping gauge comprising a socket case having a longitudinal socket provided near its upper end with an annular seat, a plunger rod having a longitudinal guide groove, and near its upper end an adjustable collar, a spiral spring on the plunger between said seat and the collar, a lock nut having a threaded hollow stem, a brake pin in the stem and having an inner head adapted to bear in said groove of the plunger for setting the latter in a desired position.

In testimony whereof I affix my signature in presence of two witnesses.

WILLIAM WITTNER.

Witnesses:
CHAS. W. BRUGER,
RICHARD GABRIELSKY.